US012568986B2

(12) United States Patent
Brown et al.

(10) Patent No.: US 12,568,986 B2
(45) Date of Patent: Mar. 10, 2026

(54) METHOD OF REDUCING ACRYLAMIDE IN COFFEE EXTRACT AND A SOLUBLE COFFEE PRODUCT

(71) Applicant: Koninklijke Douwe Egberts B.V., Utrecht (NL)

(72) Inventors: Ian Brown, Banbury (GB); Robert Stanley Farr, Banbury (GB); Thomas Imison, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 309 days.

(21) Appl. No.: 18/265,215

(22) PCT Filed: Dec. 7, 2021

(86) PCT No.: PCT/EP2021/084541
§ 371 (c)(1),
(2) Date: Jun. 2, 2023

(87) PCT Pub. No.: WO2022/122714
PCT Pub. Date: Jun. 16, 2022

(65) Prior Publication Data
US 2024/0008505 A1 Jan. 11, 2024

(30) Foreign Application Priority Data
Dec. 8, 2020 (GB) ..................................... 2019323

(51) Int. Cl.
A23F 5/26 (2006.01)
A23F 5/18 (2006.01)
A23F 5/34 (2006.01)

(52) U.S. Cl.
CPC ................ *A23F 5/185* (2013.01); *A23F 5/26* (2013.01); *A23F 5/34* (2013.01)

(58) Field of Classification Search
CPC ........... A23V 2300/10; A23V 2300/30; A23V 2300/34; A23V 2300/38; A23V 2300/46; (Continued)

(56) References Cited

U.S. PATENT DOCUMENTS

| | | | |
|---|---|---|---|
| 3,700,463 | A | 10/1972 | Bolt |
| 3,720,518 | A | 3/1973 | Galdo |

(Continued)

FOREIGN PATENT DOCUMENTS

| | | |
|---|---|---|
| AU | 6935191 A | 8/1991 |
| EP | 0159754 | 10/1985 |

(Continued)

OTHER PUBLICATIONS

Strocchi, Giulia, Patrizia Rubiolo, Chiara Cordero, Carlo Bicchi and Erica Liberto, Acrylamide in Coffee: What Is Known and What Still Needs to Be Explored, Food Chemistry 393 (2022) 133406, pp. 1-12. (Year: 2022).*

(Continued)

*Primary Examiner* — Hong T Yoo
(74) *Attorney, Agent, or Firm* — Fitch, Even, Tabin & Flannery LLP

(57) ABSTRACT
The present invention provides a method of reducing acrylamide in an aqueous coffee extract, the method comprising: contacting an acrylamide-containing aqueous coffee extract with spent coffee grounds at a temperature of 70 to 120° C. for at least 30 minutes to form an acrylamide-depleted coffee extract.

15 Claims, 2 Drawing Sheets

Extract
(Low Acrylamide)

Products and unreacted
materials to separation

Spent Grounds
Catalyst on support

Diffuser

Reactants
Extract
(High Acrylamide)

(58) Field of Classification Search
CPC ............ A23V 2300/50; A23V 2300/14; A23V 2300/02; A23L 27/11; A23L 5/20; A23L 5/23; A23L 5/27; A23F 5/02; A23F 5/04; A23F 5/18; A23F 5/16; A23F 5/28; A23F 5/24; A23F 5/26; A23F 5/00; A23F 5/10; A23F 5/262; A23F 5/50
USPC ........... 424/725; 426/432, 45, 425, 431, 594
See application file for complete search history.

(56) References Cited

U.S. PATENT DOCUMENTS

| | | |
|---|---|---|
| 5,328,708 A | 7/1994 | Rizzi |
| 7,220,440 B2 | 5/2007 | Dria |

FOREIGN PATENT DOCUMENTS

| | | |
|---|---|---|
| EP | 3254568 | 12/2017 |
| GB | 2514138 | 11/2014 |
| JP | H1066466 A | 3/1998 |
| RU | 2014103441 | 8/2015 |
| WO | 2013005145 A1 | 1/2013 |

OTHER PUBLICATIONS

Combined Search and Examination Report, dated May 24, 2021, Patent Application No. GB2019323.1 (6 pgs.).

Guenther, et al.; "Acrylamide in coffee: Review of progress in analysis, formation and level reduction", Food Additives & Contaminants, Supplement 1, 2007, vol. 24, pp. 60-70.

International Search Report and Written Opinion, date of mailing May 3, 20222, International Application No. PCT/EP2021/084541 (10 pgs.).

Notification of the First Office Action, dated Dec. 27, 2024, Chinese Patent Application No. 202180082082.7, with English translation (10 pgs.).

Office Action dated Dec. 28, 2023, Russian Patent Application No. 2023118167, with English translation (7 pgs.).

Decision of Rejection, date of mail Apr. 26, 2025, Chinese Patent Application No. 202180082082.7, with English translation (10 pgs.).

"Food Toxicology", China Agricultural University Press, Aug. 2009, with English translation (10 pgs.).

"Present Knowledge in Food Safety,"; China Light Industry Press, Jul. 2020, with English translation (10 pgs.).

* cited by examiner $F_0, T_0, c_0$

Residence Time
Preferentially
>30minutes $T_c$
Preferentially
>90C h

Slurry Out T, c

To filter low AA
Extract (like RPF)

F r

METHOD OF REDUCING ACRYLAMIDE IN COFFEE EXTRACT AND A SOLUBLE COFFEE PRODUCT

CROSS REFERENCE TO RELATED APPLICATIONS

This application is a U.S. national phase application of International Application No. PCT/EP2021/084541, filed Dec. 7, 2021, which claims benefit from United Kingdom Application 2019323.1, filed Dec. 8, 2020, which are each hereby incorporated herein by reference in their entirety.

FIELD

The present invention relates to a method of reducing acrylamide in an aqueous coffee extract and to a method for producing a soluble coffee product from the extract having a reduced acrylamide content. Such products are able to provide consumers with an improved coffee beverage having lower levels of acrylamide.

BACKGROUND

The extraction of roast and ground coffee with water to obtain a high coffee-solids liquid coffee concentrate is well known. Moreover, it is well known to dry such a concentrate with spray- or freeze-drying to obtain a soluble beverage product. The liquid coffee concentrate and the soluble beverage product can then be reconstituted at the consumer's convenience with hot (or cold) water to obtain a coffee beverage. The industrial production of liquid coffee concentrates is associated with higher temperatures and pressures than coffee shop brewing systems. This allows a higher yield to be obtained from the beans and a reduced waste stream, but has a side-effect that the coffee can adopt undesirable processing flavour notes.

More recently it has been discovered that food products that are subjected to high temperatures during processing often contain high levels of acrylamide. These temperatures can be reached during the first minutes of the coffee roasting process where the highest amount of acrylamide have been reported. Since acrylamide is a probably carcinogenic substance, the food industry is unified in trying to reduce the levels of acrylamide in food. It is therefore desirable to implement measures to reduce the levels of acrylamide that accumulate during the coffee production.

The level of acrylamide in instant coffee is of some concern to the industry. Commission Regulation (EU) 2017/2158 states that food manufacturers should be striving to achieve levels as low as reasonably achievable and benchmark levels for instant coffee have been set at 850 ppb. In roast and ground coffee, the challenge is particularly with the lighter roasts, since acrylamide degrades under the more severe roasting conditions.

Asparagine is converted to acrylamide, amongst other products, through chemical reaction at elevated temperatures. Unlike most other food products, coffee shows a decrease in acrylamide with increasing processing (roasting) time. All foods show this effect if heated sufficiently but under normal processing conditions most foods do not convert all their asparagine to acrylamide, hence longer processing times generally result in higher acrylamide levels. However, with coffee, all the asparagine is exhausted before processing is completed, and acrylamide levels then begin to fall. The most probable mechanisms for loss of acrylamide are polymerisation, degradation, or reaction with other food components.

However, it has been observed that acrylamide increases during the extraction process used to produce instant coffee from roast and ground coffee, despite the fact that the key precursor, asparagine, has been exhausted. As a result, levels can be undesirably high.

It is known in the prior art that acrylamide levels fall very gradually during storage in roast and ground coffee; Guenther et al., Food Additives & Contaminants, Vol 24(sup1), p 60 (2007). However, long term storage of coffee is associated with staling and flavour loss, so the product no longer meets the consumer expectations.

U.S. Pat. No. 7,220,440 describes such a method of reducing the level of asparagine in unroasted coffee beans comprising adding an asparagine-reducing enzyme, for example asparaginase, to the unroasted coffee beans. This reduces the level of asparagine with a subsequent reduction in acrylamide formation upon roasting. The method utilises an enzymatic treatment of the unroasted coffee beans. However, the method typically results in 'off-flavours', which can have a negative impact on the overall aroma and flavour profile of the final coffee product. Furthermore, un-immobilised enzymes may be inadvertently and impermissibly retained in the final coffee product.

More recently, it has been shown that acrylamide can be removed directly from coffee extracts obtained from the roasted beans. EP3254568 describes the use of an adsorbent resin for reducing acrylamide in a liquid coffee extract or soluble coffee. In this method, a liquid coffee extract is flowed over a bed of cationic adsorbent resin to achieve a reduction in acrylamide content. This method avoids some of the issues associated with enzyme activity on the unroasted beans. However, the production of coffee having a specific aroma and flavour profile is a precise and complex process, and any additional treatment step can adversely affect the properties of the final coffee product. Therefore, treatment of the liquid extract with an adsorbent resin can alter the aroma components present in the extract, and consequently may negatively affect the taste of the final coffee product.

GB2514138 discloses a method for avoiding staining of a coffee foam as the result of including finely ground roasted coffee particles in a coffee extract. The heat-holding step in this application is performed and then the roasted coffee particles are retained in the extract.

EP3254568 discloses a method for reducing acrylamide content of a liquid extract by contacting with an absorbent resin.

SUMMARY

Accordingly, it is desirable to provide an improved soluble coffee product and a method for reducing acrylamide levels therein and in the aqueous coffee extract used to prepare it and/or to tackle at least some of the problems associated with the prior art or, at least, to provide a commercially viable alternative thereto.

The inventors have now undertaken work to mitigate the formation of acrylamide during the extraction process, seeking to understand the formation pathways and identify the critical pathways. By providing an understanding of the mechanisms that cause the reduction of acrylamide during later stages of roasting, during storage of roast and ground coffee and the observed increase in acrylamide occurring during the preparation of instant coffee from roast and ground coffee beans, the inventors have been able to develop strategies to minimise adverse changes in acrylamide during the production of instant coffee.

In a first aspect, the present invention provides a method of reducing acrylamide, i.e. a level of acrylamide, in an aqueous coffee extract, the method comprising:

contacting an acrylamide-containing aqueous coffee extract with spent coffee grounds at a temperature of 70 to 120° C. for at least 30 minutes to form an acrylamide-depleted coffee extract.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the inventors' work, a series of precursors (free amino acids, reducing sugars), intermediates (3-aminopropiona-mide (3-APA)) and reaction products (acrylamide, pyrazines and pyrroles) were monitored during the extraction of five different roast and ground coffees: Robusta very light roast, light roast, medium roast and dark roast, and Arabica medium roast. Samples of the green beans, the roasted beans and samples taken from the primary, secondary and tertiary extractions were analysed. In this contact a primary extraction will typically take place at a temperature of from 100-140° C., a secondary at 160-185° C. and a tertiary at 175-220° C.

Green beans contain sugars and free amino acids which react during roasting to form colour, flavour and acrylamide. After roasting, these precursors are severely depleted and there is no evidence of significant amounts of the intermediate 3-APA. In the darker roasts there is no detectable asparagine. The more severe the roast the greater the depletion of Maillard precursors, the greater the formation of flavour compounds such as pyrazines and pyrroles, but the greater the degradation of acrylamide.

During the three extraction process stages, free amino acids, including asparagine, are generated at all stages, but by the end of the tertiary process asparagine is once again exhausted. Crucially, during the tertiary extraction, breakdown of galactomannans produces a substantial increase in the reducing sugars, glucose and mannose. At this stage, there is an accumulation of free amino acids, a significant increase in reducing sugars and a high temperature. This is where most of the acrylamide is generated in situ.

The results thus showed an increase in free amino acids during all extraction stages, and crucially asparagine, the key precursor of acrylamide, was detected in all the primary and secondary extracts. However, a source of reducing sugars is also required for the formation of acrylamide. The results showed that during the highest temperature stage, where the temperature is high enough to break up the galactomannans in the coffee, there was a significant increase in glucose and mannose. Thus in the high temperature tertiary phase there are relatively high levels of sugars, and an accumulation of free amino acids, including asparagine, which also promote the formation of acrylamide. Under these conditions, there is a significant increase in acrylamide, with levels in accumulated extracts reaching 1200 ppb.

These findings support in part the observed elevated levels of acrylamide found in instant coffee above those anticipated to originate purely from the roasting process. Key to mitigating the formation of new acrylamide during the tertiary extraction process is preventing the breakdown of the galactomannans. Carrying out the bulk of the extraction at temperatures below those required to break down the galactomannans may be one way forward. Alternatively, the time of the high temperature extraction could be extended, but this would have an impact on the flavour of the final product, particularly the last two, where there is likely to be a significant increase in the burnt character of the coffee.

However, the inventors also realised that the levels of acrylamide were higher than could be accounted for just by having conditions suitable for the formation of new acrylamide. They theorised that acrylamide which has been chemically or physically bound in the coffee may be also being released. Without wishing to be bound by theory, it seems that the most likely candidate for this reversible trapping of acrylamides is thought to be melanoidins in the coffee. These heterogeneous, nitrogen-containing, brown pigments are produced in roast coffee and other cooked foods during the final stage of the Maillard reaction. They are formed by cyclisation, dehydration, rearrangement, and condensation of low molecular weight Maillard products. The chemical composition of melanoidin structures is largely unknown, due to the complexity of the products. However, their composition will depend on polysaccharides (galactomannans and arabinogalactans), amino acids, proteins, and phenolic compounds (chlorogenic, caffeic, or ferulic acids) found in coffee beans. The nature of the binding could be physical, such as inclusion within the complex melanoidin structure (cf. inclusion of small molecules in maltodextrins) or could involve covalent links between acrylamide and the melanoidins. Acrylamide is known to undergo Michael addition with thiol or amino groups and this is would lead to losses of acrylamide during thermal processing. Although this reaction was thought to be an irreversible route to acrylamide reduction the inventors found evidence that the reaction could be reversible. If the Michael addition is reversible under high pressure and high moisture conditions used for coffee extraction during instant coffee processing, this would provide an explanation for the increased acrylamide in instant coffee.

The inventors realised that if the acrylamide was being released under the high temperatures then there could be method steps which could be undertaken to cause the acrylamide to be taken up again within the coffee melanoidins, trapping the acrylamide away within the beans and not within the coffee extract. It was theorised that the mechanism permitting re-uptake of the acrylamide could also be responsible for acrylamide that appears to be lost during storage of roast coffee beans and ground coffee. Consequently, they have arrived at a method for optimally causing uptake of the acrylamide into the coffee melanoidins causing a drop in the levels of acrylamide in the coffee extract and without needing to compromise the extraction process with lower temperatures or burned flavours.

Thus the present invention lies in the use of a further heat treatment step utilising the spent coffee beans which would otherwise be a waste product. Without wishing to be bound by theory, it is understood that the heat treatment accelerates the rate at which the acrylamide in the coffee extract becomes bound with the melanodins within the spent coffee grounds. Thus, after treatment the aqueous coffee extract has a lower level of acrylamide since this has been retained in the spent coffee material which is then discarded, or can be used for other purposes such as burning for energy recovery.

The present invention relates to a method of reducing acrylamide in an aqueous coffee extract. An aqueous coffee extract is a liquid solution of soluble coffee solids. An aqueous coffee extract can be defined by its level of coffee solids and can be subjected to a drying step to form a soluble coffee powder, also known as an instant coffee product. Preferably the acrylamide-containing aqueous coffee extract comprises from 1 to 55 wt % soluble coffee solids. Low levels of solids make for easier processing conditions for circulating the extract through spent coffee grounds, but higher water contents require more energy for subsequent drying to produce instant coffee powders. Ideal solids levels for subsequent drying are 45 to 55%. Ideal levels for ready circulation are from 1 to 25%, preferably 2 to 10%.

Aqueous coffee extracts are generally produced by the extraction of roast and ground coffee beans, though for the sake of completeness it is noted that a coffee beverage is also an aqueous coffee extract whether it has been directly made by extraction of roast and ground coffee or by reconstitution of a soluble coffee powder with hot water. When roast and ground coffee is extracted with hot water it will inevitably contain some acrylamide. This acrylamide may be produced during the roasting of the coffee beans, with levels depending on the degree of roast. Thus some of the acrylamide in the aqueous coffee extract is simply washed out of the roasted coffee beans on extraction with hot water. Consequently, a coffee-shop extraction of fresh roasted coffee beans will contain acrylamide from the roasting process.

Acrylamide is also produced in the high temperature extraction of the roast and ground beans with hot water and steam. When industrial processes are employed to maximise the yield from the coffee beans for producing soluble coffee powders, temperatures in excess of 175° C. and even up to 260° C. can be used. Conventional industrial extraction involves a number of extraction stages with increasing temperatures, up to and including steps in excess of 200° C. At these temperatures, especially above 175° C., it has been found that further acrylamide is released or formed in the aqueous coffee extract.

Preferably, before being contacted with the spent coffee grounds the aqueous coffee extract comprises at least 500 ppb acrylamide. Typical acrylamide-containing aqueous coffee extracts used during soluble coffee production will contain from 500 ppb to 2000 ppb acrylamide, such as 1000 to 1500 ppb.

The method of the invention involves contacting an acrylamide-containing aqueous coffee extract with spent coffee grounds at a temperature of 70 to 120° C. for at least 30 minutes to form an acrylamide-depleted coffee extract. That is, the aqueous coffee extract to be treated is held with spent coffee grounds at temperatures kept within the range of 70 to 120° C. for at least 30 minutes. The holding may involve the use of a storage tank, filtering through a bed of spent coffee beans optionally with a recirculation process, or a slurry treatment system. When filtering through the bed, a recirculation system can ensure that the extract stays at a suitable temperature for a suitable time while in contact with the beans.

In the present invention the extract is contacted for a time and then the contact is stopped. That is, the spent coffee grounds are separated from the coffee extract, so that the coffee extract can be used as normal (such as to make a soluble coffee powder). The spent coffee grounds may be readily removed from the extract by a screening or decanting step. Many different techniques and devices are known for use in separating coffee extracts from roasted coffee beans. In this way the spent coffee grounds can be reused to treat further extract, until they are enriched with acrylamide and may be discarded from the process.

Preferably, after the step of contacting an acrylamide-containing aqueous coffee extract with spent coffee grounds, there is a further step of recovering the spent coffee grounds from the aqueous coffee extract to provide a treated acrylamide-depleted aqueous coffee extract. This step will preferably remove at least 90 wt %, more preferably at least 95 wt % and most preferably at least 99 wt % or substantially all of the spent coffee grounds.

Spent coffee grounds are a known product in the art of soluble coffee extraction. In general, so long as roast and ground coffee still contains any extractable material which could be obtained by a further extraction step without requiring such high temperatures as to cause undesirable levels of off-flavour production, it will be subjected to further processing and is not considered to be spent. Thus spent coffee grounds are the roast and ground coffee material remaining after aqueous extraction at the point where they would ordinarily be discarded or combusted for energy generation.

In the context of the present invention, spent coffee grounds have at least been subjected to an aqueous extraction at a temperature of 175° C. or higher, preferably 200° C. or higher and more preferably 205° C. to 240° C. Preferably the spent coffee is devoid of further useful extractable coffee solids.

The acrylamide-containing aqueous coffee extract is contacted with the spent coffee grounds at a temperature of at least 70° C. since below this temperature the rate of acrylamide reduction is too low for commercial use. A temperature below 120° C. is used to prevent the release or production of additional acrylamide in the extract. The processing time is at least 30 minutes to achieve sufficient acrylamide reduction at these temperatures. Preferably the acrylamide-containing aqueous coffee extract is contacted with the spent coffee grounds at a temperature of from 100 to 120° C. Most preferably the temperature is from 110 to 120° C.

Preferably the processing time is from 30 minutes to 50 hours, preferably 1 hour to 24 hours and more preferably 2 hours to 10 hours. These time periods strike the optimum balance for reduction without compromising the flavour and compatibility with industrial instant coffee production. After this time period is complete, the spent coffee grounds are removed from the aqueous coffee extract.

The amount of spent grounds required for the process depends on the amount of coffee extract to be treated. Typically an amount of at least 1 kg of spent coffee grounds can be used to treat 100 kg of coffee extract, by weight of the soluble coffee solids in the coffee extract (i.e. on a dry basis), more preferably at least 10 kg of spent coffee grounds and preferably from 20 to 100 kg of spent coffee grounds per 100 kg of coffee extract.

Such a holding step, involving contacting coffee extract with coffee material at a temperature lower than a previous extraction step is not performed in conventional industrial processing. This is because the drive in conventional processing is to increase the yield with increasing temperature steps and then to produce a dried powder product quickly to avoid taking up factory space and to avoid holding times which could lead to a loss of product quality.

The method produces an acrylamide-depleted coffee extract. Preferably this comprises less than 400 ppb acrylamide, more preferably less than 200 ppb acrylamide more preferably less than 100 ppb acrylamide, and most preferably essentially no acrylamide. Preferably the method reduces the acrylamide levels by at least 30%, more preferably by at least 40%, preferably more than 75%. Levels of reduction can be more than 80%, such as 95% when using higher temperatures and longer treatment times as shown in the examples. The method may have some consequence for the taste of the product, however, with higher levels of acrylamide reduction leading to higher impacts on the taste.

Preferably the acrylamide-containing aqueous coffee extract is passed through the spent coffee grounds in a continuous process. This is industrially efficient and allows for continuous production of dried coffee products.

Preferably the spent coffee grounds are provided as a bed of spent coffee grounds. Use of percolation of water through coffee beds is well known in the art, so it is straightforward to adapt existing equipment to the treatment method described herein.

Preferably the bed of spent coffee is held in a sealed chamber, which can be optionally maintained under a super-atmospheric pressure. This is preferably at least 1 bar above atmospheric pressure, such as from 1 to 500 Bar, preferably from 2 to 25 Bar This helps to avoid the loss of volatile flavour and aroma compounds during the treatment.

According to a further aspect there is provided a method of producing a soluble coffee product, the method comprising:

providing spent coffee grounds;

providing roasted and ground coffee beans;

performing an aqueous extraction of the roasted and ground coffee beans at a temperature of from 175 to 220° C., preferably 175 to 205° C. to obtain an acrylamide-containing aqueous coffee extract;

performing the method of the first aspect using the spent coffee grounds to obtain the acrylamide-depleted coffee extract;

drying the acrylamide-depleted coffee extract to provide a soluble coffee product.

Preferably the aqueous extraction of the roasted and ground coffee beans at a temperature of from 175 to 220° C. to obtain an acrylamide-containing aqueous coffee extract also produces spent coffee grounds which can be used in the same or subsequent treatment of the aqueous coffee extract to obtain the acrylamide-depleted coffee extract.

Preferably the step of drying is a step of spray-drying or a step of freeze-drying. These steps produce a conventional soluble coffee product. Any steps normally used in the production of such products may be used herein, including the addition of gases for foaming and reducing product density, and the supplementation with roast and ground coffee particles or other beverage ingredients such as creamer or sugar.

BRIEF DESCRIPTION OF THE FIGURE

The invention will now be described further with reference to the following non-limiting figures, in which.

DETAILED DESCRIPTION

Figure 1:
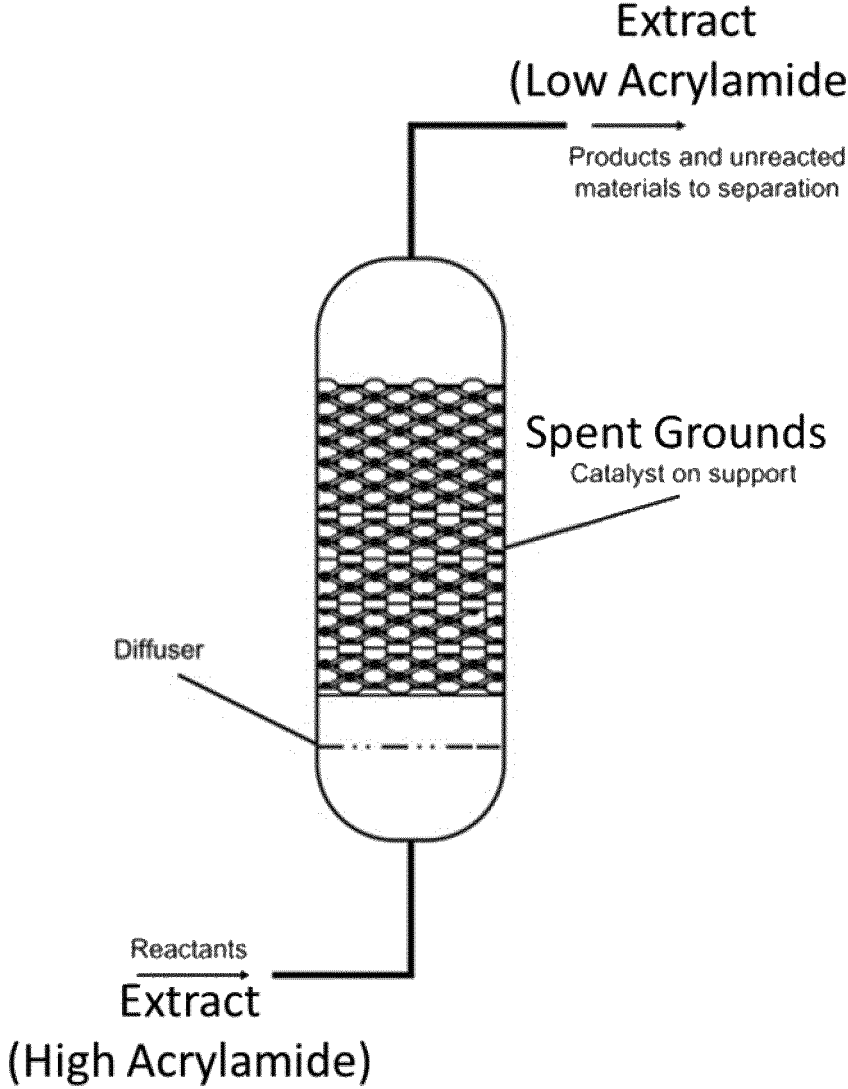
FIG. 1 shows a configuration for a percolation bed with optional recirculation for contacting aqueous coffee extract with spent coffee grounds.
Figure 2:
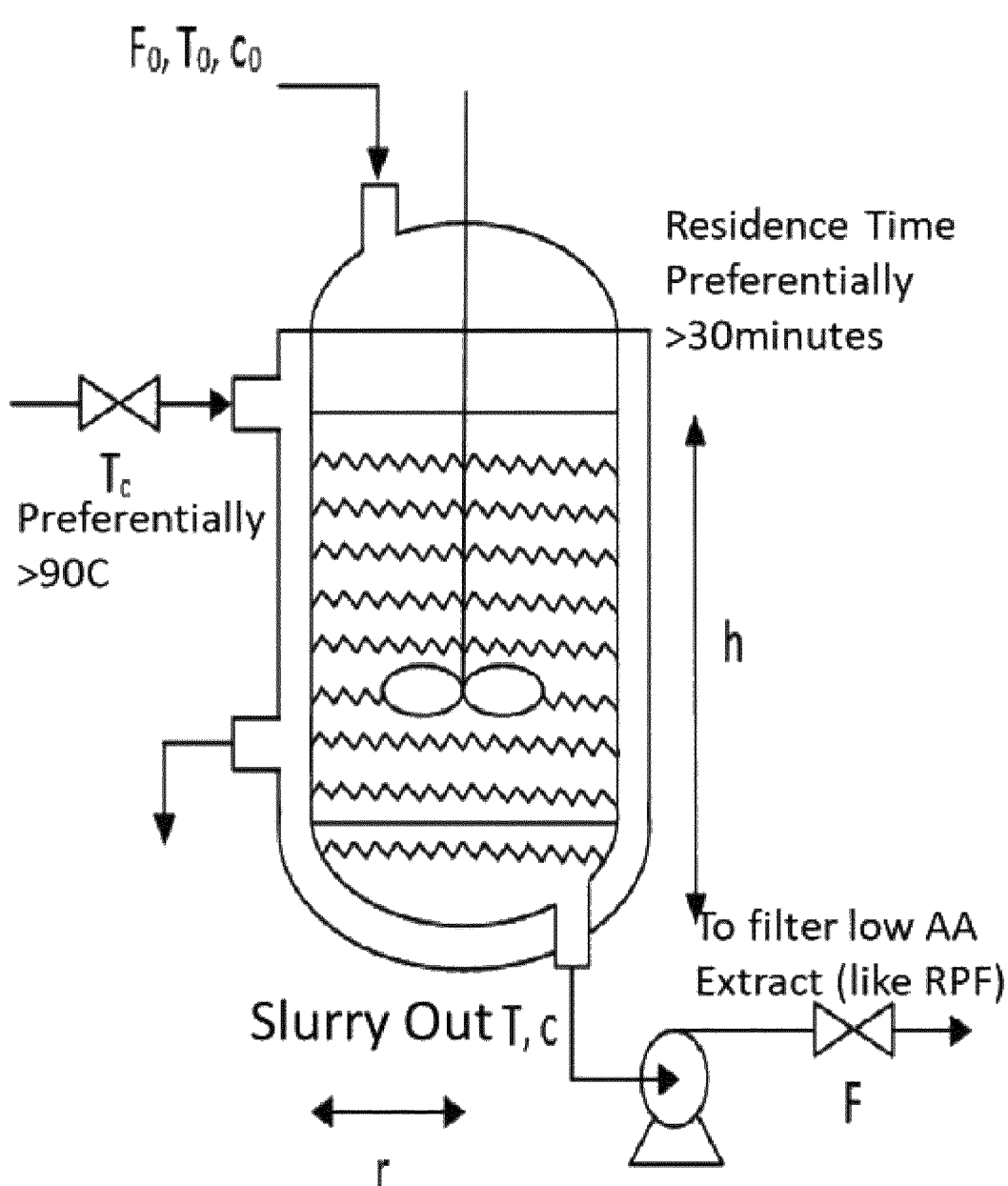
FIG. 2 shows a slurry treatment system for contacting aqueous coffee extract with spent coffee grounds.

The invention will now be described further with reference to the following non-limiting examples.

Aqueous coffee extracts obtained by a three stage extraction process, including a final aqueous extraction step at around 200° C. were held in contact with spent coffee grounds and their levels of acrylamide were measured before and after treatment. The reduction observed is summarised in the table below. The normalised level is based on the starting level of acrylamide being set to 1.

| Treatment Temperature (° C.) | Holding time (hrs) | Normalised Acrylamide Level |
|---|---|---|
| 120 | 1 | 0.18 |
| 120 | 3 | 0.05 |
| 70 | 3 | 0.58 |
| 70 | 50 | 0.39 |
| 37 | 400 | 0.85 |
| 37 | 750 | 0.85 |
| 37 | 1100 | 0.68 |
| 37 | 1450 | 0.52 |
| 23 | 400 | 0.92 |
| 23 | 750 | 0.92 |
| 23 | 1100 | 0.89 |
| 23 | 1450 | 0.76 |

As can be seen, acrylamide levels dropped for all tested samples, but only within the range of 70 to 120° C. were the treatment times within commercially viable durations.

Although preferred embodiments of the invention have been described herein in detail, it will be understood by those skilled in the art that variations may be made thereto without departing from the scope of the invention or of the appended claims.

The invention claimed is:

1. A method of producing a soluble coffee product, the method comprising:

(i) performing an aqueous extraction of roast and ground coffee beans at a temperature of at least 175° C. to provide spent coffee grounds;

(ii) providing further roasted and ground coffee beans;

(iii) performing an aqueous extraction of the further roasted and ground coffee beans at a temperature of from 175 to 220° C. to obtain an acrylamide-containing aqueous coffee extract;

(iv) reducing acrylamide in the acrylamide-containing aqueous coffee extract to obtain an acrylamide-depleted coffee extract by contacting the acrylamide-containing aqueous coffee extract with the spent coffee grounds at a temperature of 70 to 120° C. for at least 30 minutes to obtain an acrylamide-depleted coffee extract; and (v) drying the acrylamide-depleted coffee extract to provide the soluble coffee product.

2. A method according to claim 1, wherein the step of drying is a step of spray-drying or a step of freeze-drying.

3. A method according to claim 1, wherein the step of performing the aqueous extraction of the roasted and ground coffee beans is at the temperature of from 175 to 205° C.

4. A method according to claim 1, wherein, in step (iv), before being contacted with the spent coffee grounds the aqueous coffee extract comprises at least 500 ppb acrylamide.

5. A method according to claim 1, wherein, in step (iv), the acrylamide-depleted coffee extract comprises less than 400 ppb acrylamide.

6. A method according to claim 1, wherein the method in step (iv) reduces the acrylamide levels by at least 30%.

7. A method according to claim 1, wherein, in step (iv), the acrylamide-containing aqueous coffee extract is contacted with the spent coffee grounds at a temperature of from 100 to 120° C.

8. A method according to claim 1, wherein, in step (iv), the acrylamide-containing aqueous coffee extract is contacted with the spent coffee grounds for from 1 to 50 hours.

9. A method according to claim 8, wherein, in step (iv), the acrylamide-containing aqueous coffee extract is contacted with the spent coffee grounds for from 2 to 10 hours.

10. A method according to claim 1, wherein, in step (iv), the acrylamide-containing aqueous coffee extract is passed through the spent coffee grounds in a continuous process.

11. A method according to claim 1, wherein, in step (iv), the acrylamide-containing aqueous coffee extract comprises from 1 to 55 wt % soluble coffee solids.

12. A method according to claim 1, wherein, in step (iv), the spent coffee grounds are provided as a bed of spent coffee grounds.

13. A method according to claim 12, wherein, in step (iv), the bed of spent coffee is held in a sealed pressure chamber.

14. A method according to 1, wherein the step (i) of performing the aqueous extraction of roast and ground coffee beans is performed at the temperature of at least 200° C.

15. A method according to claim 14, wherein the step (i) of performing the aqueous extraction of roast and ground coffee beans is performed at the temperature of 205 to 240° C.

* * * * *